(12) United States Patent  (10) Patent No.: US 9,700,898 B1
Shumka et al.  (45) Date of Patent: Jul. 11, 2017

(54) SYSTEM AND METHOD FOR MEASURING A CLOSED-SIDE AND/OR OPEN-SIDE SETTING OF A GYRATORY CRUSHER

(71) Applicants: Thomas Shumka, Kelowna (CA); Jason Shumka, Kelowna (CA)

(72) Inventors: Thomas Shumka, Kelowna (CA); Jason Shumka, Kelowna (CA)

(73) Assignee: Crusher Vision, Inc. (CA)

( * ) Notice: Subject to any disclaimer, the term of this patent is extended or adjusted under 35 U.S.C. 154(b) by 0 days.

(21) Appl. No.: 15/300,323

(22) PCT Filed: Mar. 31, 2015

(86) PCT No.: PCT/IB2015/052349
§ 371 (c)(1),
(2) Date: Sep. 29, 2016

(87) PCT Pub. No.: WO2015/151018
PCT Pub. Date: Oct. 8, 2015

Related U.S. Application Data

(60) Provisional application No. 61/972,474, filed on Mar. 31, 2014.

(51) Int. Cl.
*B02C 25/00* (2006.01)
*B02C 2/06* (2006.01)
(Continued)

(52) U.S. Cl.
CPC .............. *B02C 25/00* (2013.01); *B02C 2/005* (2013.01); *B02C 2/06* (2013.01); *G01B 11/02* (2013.01); *G01B 11/14* (2013.01)

(58) Field of Classification Search
CPC ........... B02C 25/00; B02C 2/06; B02C 2/005; G01B 11/02; G01B 11/14
See application file for complete search history.

(56) References Cited

U.S. PATENT DOCUMENTS 7,647,200 B2 * 1/2010 Loyer ....................... B02C 2/06
241/30
7,815,133 B2 10/2010 Belotserkovsky
(Continued)

OTHER PUBLICATIONS

WIPO, Canadian International Searching Authority and Written Opinion, International Search Report mailed July 21, 2015, International Patent Application No. PCT/IB2015/052349, 6 Pages.

*Primary Examiner* — Mark Rosenbaum
(74) *Attorney, Agent, or Firm* — Baumgartner Patent Law; Marc Baumgartner

(57) ABSTRACT

An improved gyratory crusher is provided. The gyratory crusher comprises an eccentrically rotating mantle lined with a mantle liner, a concave lined with a concave liner, the concave housing the mantle to provide a crusher chamber, and the crusher chamber having a gap. The improvement is a system for determining a close-side setting for the gyratory crusher based on the gap width. The system includes a cross hair laser emitting a first trace and a second trace, the laser mounted to mark the first trace on the mantle liner and to mark a second trace traversing the gap and at least intersecting the concave liner at a preselected position of the gap, a camera mounted to capture an image of the first and second trace, and a computer in communication with the camera, the computer comprising a memory and a processor, the memory providing instructions to the processor to process the image to provide a gap width and to calculate a close-side setting.

22 Claims, 8 Drawing Sheets

(51) Int. Cl.
    *B02C 2/00*           (2006.01)
    *G01B 11/14*        (2006.01)
    *G01B 11/02*        (2006.01)

(56) References Cited

U.S. PATENT DOCUMENTS

| | | | |
|---|---|---|---|
| 9,084,998 B2 * | 7/2015 | Belotserkovskiy | B02C 2/04 |
| 2013/0231892 A1 | 9/2013 | Franke | |
| 2016/0250642 A1 * | 9/2016 | Lindstrom | B02C 1/02 |

\* cited by examiner

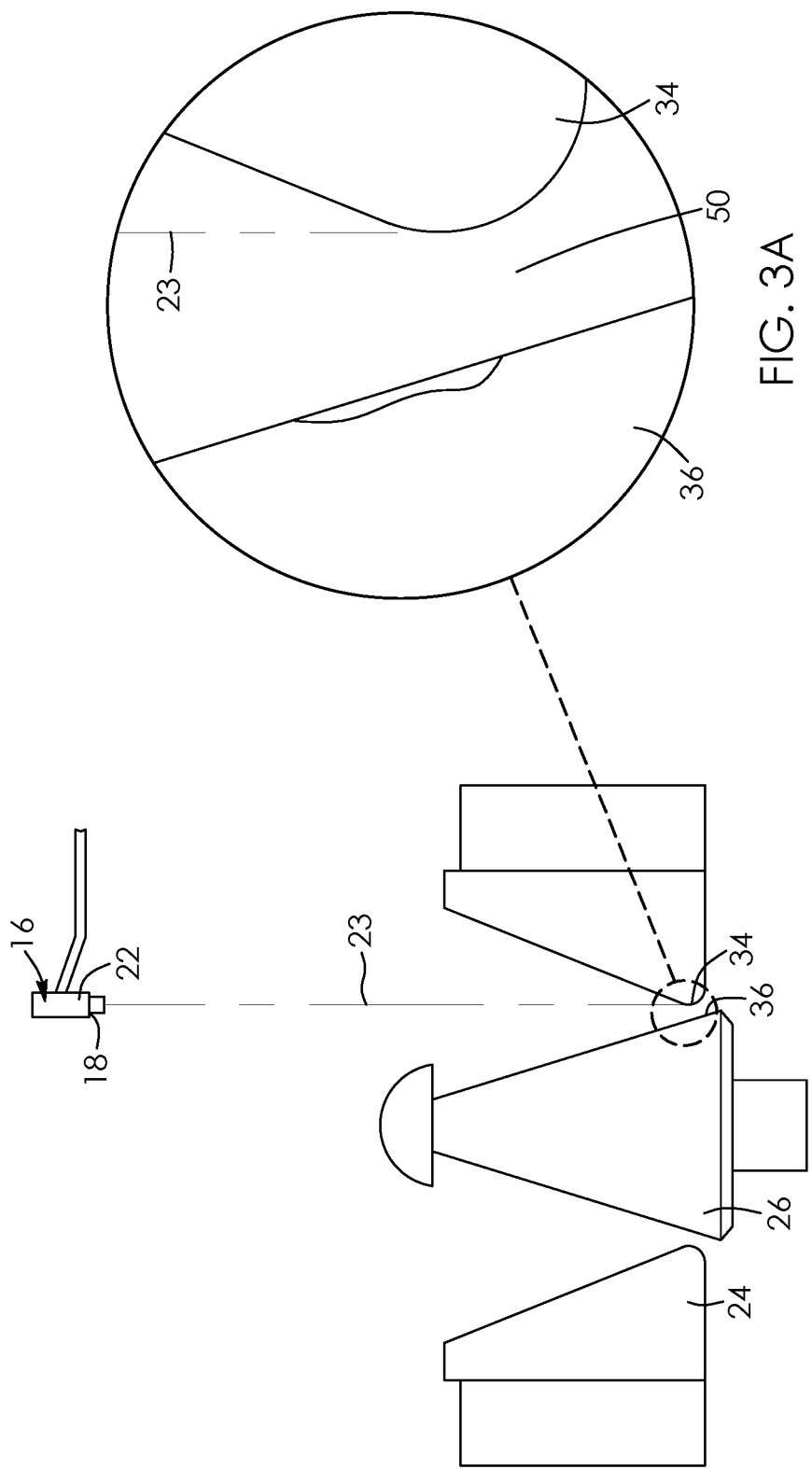

SYSTEM AND METHOD FOR MEASURING A CLOSED-SIDE AND/OR OPEN-SIDE SETTING OF A GYRATORY CRUSHER

CROSS REFERENCE TO RELATED APPLICATIONS

The present invention is filed under 35 U.S.C. §371 as the U.S. national phase of International Application No. PCT/IB2015/052349, filed Mar. 31, 2015, which designated the U.S. and claims the benefit of U.S. Provisional Patent Application No. 61/972,474, filed Mar. 31, 2014, each of which is hereby incorporated in its entirety including all tables, figures, and claims.

FIELD

The present technology is directed at a system and method for measuring a gap width of a gyratory crusher between the mantle and concave to determine wear. More specifically, the technology measures the gap at an endpoint of the eccentric rotation to provide a setting which is indicative of wear. Significantly, this can be accomplished when the crusher is operating, but empty, allowing an operator to obtain results within a few minutes or less.

The system allows the client to accurately schedule mantle and liner changeouts, based on wear rates, rather than on a fixed schedule, extending the service life of crusher components.

BACKGROUND

Crushers are commonly used in the mining and minerals processing industry in order to break down large solid materials into smaller pieces for further processing or transport. Some examples of crushers include jaw crushers, cone crushers, cylindrical roll crushers, and gyratory crushers. Large pieces of material are typically broken down in a crusher through a moving component which drives the material against a stationary component with sufficient force to fracture and fragment the material to smaller, more manageable pieces. One type of crusher is a gyratory crusher which comprises a moving mantle and a stationary concave. Each of the mantle and concave are covered by liners. The mantle moves on a eccentric in a circular orbit within the concave, causing an annular gap at each radial location inside the crusher to narrow and widen as the mantle moves around its orbit. The narrowest gap between the mantle liner and the concave liner is known as the closed-side setting (CSS). The widest gap between the mantle liner and the concave liner is known as the open-side setting (OSS).

Operators of gyratory crushers try to maintain the CSS at a constant value to ensure efficient and predictable operation. Due to the frictional wear and tear on the concave liner and the mantle liner from the crushing operation, the CSS will get larger over time, and adjustments must be periodically made to ensure a constant CSS is maintained. It is critical to know the crusher gap width as it relates to the CSS to ensure the crushed product size is optimum for the mill feed.

Adjustments may be made by varying the position of the mantle (usually in the vertical direction) relative to each other, or the concave liner and/or the mantle liner may be replaced when excessively worn and adjustment is no longer feasible. Disadvantageously, known methods for measuring the CSS requires shutting down the crusher for an extended period to allow a person to enter the crusher and manually measure the CSS; this may involve a laborious task of removing various components in order to access the mantle and the concave. Such shut down results in downtime and loss of production. Also, the manual measurement presents certain safety concerns, as a person must brought into the vicinity of the crusher while becoming exposed to crushed rock, dust, and debris. In another method, mantle wear is measured with 3-dimensional laser imaging. This requires shutting down the crusher and the use of an overhead crane for the imaging.

One system for measuring CSS is disclosed in US Publication No. 20130231892. It is for measuring the displacement of a surface in a material handling system relative to a base reference. The system includes scanning means to generate point cloud data of the surface relative to a reference point to define a three-dimensional image of the surface, storage means to store base reference data in respect of the base reference, and processing means to process the point cloud data and the base reference data to determine the relative displacement of the surface with respect to the base reference. The processing means includes a referencing means to orientate the point cloud data relative to key reference data of the base surface and transforming the point cloud data and the base reference data into a common co-ordinate system, and displacement processing means to calculate the displacement between the surface and the base reference using both sets of data in the co-ordinate system. This system has been determined to be very expensive and overly complex. It maps the surface of the parts of interest. Further, the crusher or mill must be stopped and decontaminated before scanning can be done. The scanner is then positioned in the mill or crusher, the scans are done to provide data and then the scanner is removed. The data are then analyzed to provide a three-dimensional map. The scanner then needs to be removed before operations can start again. Accordingly, this is a disruptive process that results in significant down time.

What is needed is a safe, quick method for determining CSS or OSS. Preferably, this could be done without shutting the crusher down. A system to allow such a method is therefore also needed. It would be preferably if the laser emitter and camera could be permanently mounted.

SUMMARY

The present technology provides a system for determining CSS in a gyratory crusher by measuring the gap width. The detector assembly is permanently mounted, and once the laser emitter of the detector assembly is calibrated, allows for daily determinations of CSS. The determination can be completed in less than five minutes and does not require that the crusher be shut down. Measurements are taken while the crusher mantle continues to rotate. The system allows personnel to obtain the data risk free and provides much quicker results than past practice. The daily reading helps predict the mantle life and also allows for maximization of the mantle life. With accurate data a mine can trend the mantle daily and plan mantle change outs with accuracy. The technology also provides the benefit of keeping the target crush size constant. This helps with mill throughput.

The mantle life is predicted to be extended using this technology because it assists the choke feeding, and choke feeding reduces mantle wear.

Another advantage is that when the technology is utilized daily, the crusher tonnage and production quality is maintained—incorrect settings result in either reduced tonnage or materials that are too coarse.

In one embodiment, a system for determining a close-side setting or an open-side setting for a gyratory crusher is provided, wherein the gyratory crusher comprises an eccentrically rotatable mantle lined with a mantle liner, a concave lined with a concave liner, the concave housing the mantle to provide a crusher chamber, the crusher chamber having a gap, the system comprising a laser emitter mounted to mark a first trace bisecting the mantle at a predetermined rotational position of the mantle at the gap, a camera mounted to capture an at least one image of the first trace and an outer edge of the concave liner at the predetermined rotational position of the mantle at the gap, and a computer in communication with the camera, the computer comprising a memory and a processor, the memory providing instructions to the processor to process the image to provide a gap width and to calculate at least one of a close-side setting and an open-side setting from the gap width.

In the system, the laser emitter may be a cross hair laser emitter emitting the first trace and a second trace, the laser emitter mounted to mark the first trace bisecting the mantle and to mark the second trace traversing the gap and at least intersecting the concave liner at the predetermined rotational position of the mantle to provide an offset at the outer edge of the concave liner.

In the system, the camera may be configured to capture a series of images as the mantle rotates.

In the system, the laser emitter and camera may be permanently mounted proximate the gyratory crusher.

In the system, the memory may store calibration data.

In the system, the memory may provide instructions for the processor to determine wear based on the gap width.

In another embodiment, a method of determining a close-side setting or an open-side setting for a gyratory crusher by measuring a gap width is provided, wherein the gyratory crusher comprises an eccentrically rotatable mantle lined with a mantle liner, a concave lined with a concave liner, the concave housing the mantle to provide a crusher chamber, the crusher chamber having a gap, the method comprising the steps of: (i) a laser emitter marking a first trace bisecting the mantle at a selected rotational position of the mantle at the gap; and (ii) using a machine vision system that has been calibrated: aligning an imager to capture an image of the first trace and an outer edge of the concave liner at the gap at the selected rotational position of the mantle and capturing the image; processing the image; measuring a distance between the first trace and the concave liner edge to provide a gap width; and calculating the closed-side setting or the open-side setting, thereby determining at least one of the close-side setting and the open-side setting.

In the method, the imager is a camera.

In the method, the laser emitter may be a cross hair laser emitter.

In the method, the laser emitter may be a three dimensional laser emitter.

The method may further comprise the step of aligning the laser emitter such that a second trace traverses the gap and at least intersects the concave liner at the selected position of the gap to provide a first offset in the second trace for identifying an outer edge of the mantle liner and a second offset for identifying an outer edge of the concave liner.

In the method, the mantle may be rotating as the camera is capturing images.

In the method, the method may be completed in about five minutes.

In the method, the selected rotational position may provide the gap at a closed-side setting.

In the method, the selected rotational position may provide the gap at an open-side setting, the method including calculating the close-side setting from the gap width at the open-side setting.

In another embodiment, a gyratory crusher combination is provided, the gyratory crusher combination comprising a gyratory crusher including an eccentrically rotating mantle lined with a mantle liner, a concave lined with a concave liner, the concave housing the mantle to provide a crusher chamber, and the crusher chamber having a gap, the improvement comprising a system for determining a close-side setting or an open-side setting for the gyratory crusher including a laser emitter for emitting a first trace, the laser emitter mounted to mark the first trace on the mantle at a predetermined position of the gap, a camera mounted to capture a series of image of the first trace as the mantle of the gyratory crusher rotates, and a computer in communication with the camera, the computer comprising a memory and a processor, the memory for providing instructions to the processor to process the image to provide a gap width and to determine at least one of a close-side setting or an open-side setting from the gap width.

In the gyratory crusher, the laser emitter may be a cross hair laser emitter for emitting the first trace and a second trace, the laser emitter mounted to mark the first trace bisecting the mantle and to mark the second trace traversing the gap and at least intersecting the concave liner at the predetermined position of the gap.

In the gyratory crusher, the second trace may have a first offset at an outer edge of the concave liner.

In the gyratory crusher, the second trace may have a second offset at an outer edge of the mantle liner.

In the gyratory crusher, the predetermined position of the gap may be at the close-side setting.

In the gyratory crusher, the predetermined position of the gap may be at the open-side setting.

In another embodiment, a system for determining a close-side setting or an open-side setting for a jaw crusher is provided, wherein the jaw crusher comprises a first jaw plate on a first side and a second jaw plate on a pivoting jaw to provide a crusher chamber, the crusher chamber having a gap, the system comprising a laser emitter mounted to mark a first trace bisecting the pivoting jaw at a predetermined position of the pivoting jaw at the gap, a camera mounted to capture an at least one image of the first trace and an outer edge of the first jaw plate at the predetermined position of the pivoting jaw at the gap, and a computer in communication with the camera, the computer comprising a memory and a processor, the memory providing instructions to the processor to process the image to provide a gap width and to calculate at least one of a close-side setting and an open-side setting from the gap width.

BRIEF DESCRIPTION OF THE DRAWINGS

In the accompanying drawings, which illustrate one or more exemplary embodiments:

FIG. 3 is a schematic elevation view illustrating a laser emitter of the system emitting a laser light trace onto the mantle and concave and a camera located to capture an image of the laser trace. FIG. 3A is a close up.

DESCRIPTION

Figure 1:
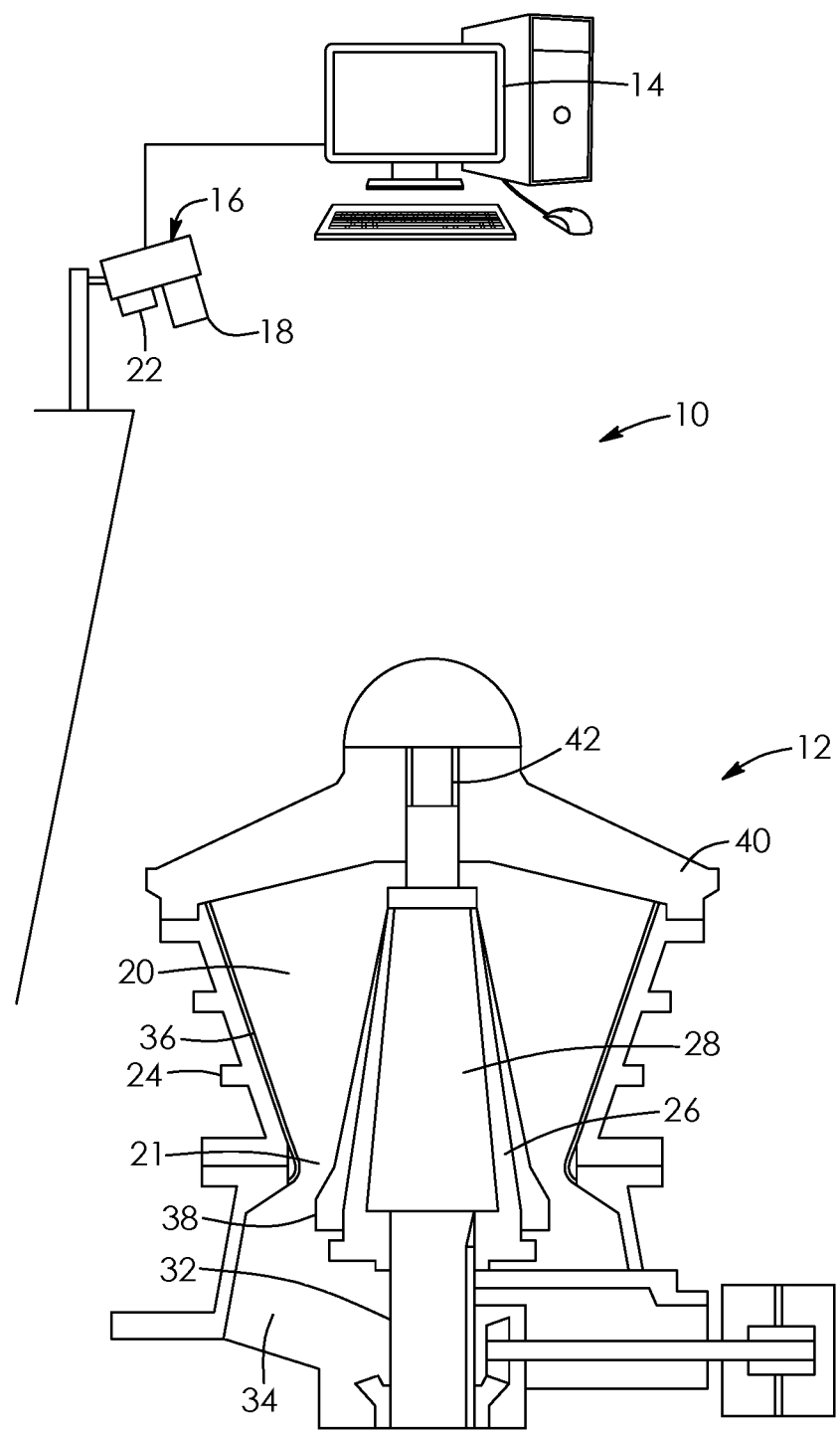
FIG. 1 is a schematic sectional view of a gyratory crusher and a system for determining a closed side setting of the gyratory crusher according to one embodiment.

Directional terms such as "front", "rear", "top", "bottom", "upper", "lower", "downwards", "vertically", "laterally", or similar, are used in the following description for the purpose of providing relative reference only, and are not intended to suggest any limitations on how any article is to be positioned during use, or to be mounted in an assembly or relative to an environment.

Except as otherwise expressly provided, the following rules of interpretation apply to this specification (written description, claims and drawings): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open-ended terms (i.e., meaning "including, but not limited to,") unless otherwise noted.

To the extent necessary to provide descriptive support, the subject matter and/or text of the appended claims is incorporated herein by reference in their entirety.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Definitions

Camera—in the context of the present technology, a camera is any device that can accurately capture an image or images of a laser trace.

Machine vision—in the context of the present technology, machine vision is provided by one or more pieces of equipment that allow for an image captured and analyzed to provide an output. In the preferred embodiment, this is an imager such as a camera, and a computer with a processor and memory.

Outer edge—in the context of the present technology, the outer edge is the edge of the mantle liner or the concave liner that faces the crushing chamber.

Edge—in the context of the present technology, an edge is where the mantle abuts the mantle liner or the concave abuts the concave liner.

Bisecting the mantle—in the context of the present technology, bisecting the mantle means that the trace crosses at least the mantle outer edge at two points along the trace line to provide a line bisecting the mantle liner or the mantle liner and mantle.

Laser emitter—in the context of the present technology, a laser emitter is a single laser emitter, a cross hair laser emitter or a scanning laser emitter (also known as a three dimensional laser emitter).

DETAILED DESCRIPTION

Embodiments of the invention described herein relate to a system and a method for measuring the closed side setting of (CSS) of a gyratory crusher by marking a mantle liner of the gyratory crusher with a crosshair laser light to indicate a mantle liner endpoint of the CSS applying image processing techniques to determine a concave liner endpoint of the CSS ("concave end"), and then calculating the distance between the concave liner and mantle liner endpoints to determine the CSS gap.

In an alternative embodiment, relate to a system and a method for measuring the open-side setting of (OSS) of a gyratory crusher by marking a mantle liner of the gyratory crusher with a crosshair laser light to indicate a mantle liner endpoint of the OSS, applying image processing techniques to determine a concave liner endpoint of the OSS ("concave end"), and then calculating the distance between the concave liner and mantle liner endpoints to determine the OSS gap.

In an alternative embodiment, the CSS is determined by marking a mantle liner of the gyratory crusher with a crosshair laser light to indicate a mantle liner endpoint of the open side setting (OSS), taking an overhead image of the marked mantle liner and a concave liner of the crusher, applying image processing techniques to determine a concave liner endpoint of the OSS ("concave end"), and then calculating the distance between the concave liner and mantle liner endpoints to determine the OSS gap. Then, using the OSS gap, calculating the CSS.

It is expected that these embodiments will provide a means for quickly and efficiently measuring the CSS in a crusher with minimal loss of downtime. The system enables the gap at CSS, the gap at OSS or the gap at any predetermined point in the rotation to be monitored and measured during crusher operation without having to remove any components to access the mantle or the concave, and without requiring a person to manually perform the measurements.

It is expected that using any of these positions of the mantle relative to the concave as the position to measure the gap width will provide an efficient means of determining CSS to determine whether adjustments to the mantle or concave are necessary, or whether a concave liner and/or a mantle liner require replacement, and enable an operator to perform maintenance only when necessary thus avoiding premature servicing and unnecessary downtime of the crusher.

Referring to FIG. 1 and according to one embodiment, a machine vision system, generally referred to as 10, for determining the CSS of a gyratory crusher, generally referred to as 12 comprises a computer 14 and a detector assembly, generally referred to as 16, in communication with the computer 14 and mounted above a gyratory crusher 12 such that an imager 18 of the detector assembly 16 faces the inside of the gyratory crusher 12 and captures images of a crushing chamber 20 inside the gyratory crusher 12. The detector assembly 16 comprises a laser emitter 22 for emitting a laser trace and the imager, which in the preferred embodiment is a camera 18. The laser emitter 22 is preferably a cross hair laser emitter or a three dimensional laser emitter, both for providing a cross hair laser light. In this embodiment, the detector assembly 16 is mounted on top of a control room of the gyratory crusher 12; however, the detector assembly 16 can be mounted on any structure such as scaffold or pole that locates the detector assembly 16 in a suitable position.

As shown in FIG. 1, the gyratory crusher 12 comprises a stationary concave 24 and a rotating mantle 26. The concave 24 comprises an upwardly-expanding frusto-conical shell and the mantle 26 comprises a downwardly expanding frusto-conical shell that is mounted on an eccentrically rotatable spindle 28 such that the mantle 26 protrudes upwards inside the concave 24. The spindle 28 is mounted to an eccentric sleeve 32 which causes the spindle 28 and mantle 26 to move around a circular orbit around the axis of the concave 24. The annular space between the concave 24 and the mantle 26 defines the crushing chamber 20 in which material is crushed; a discharge outlet 34 is communicative with the crushing chamber 20 to discharge crushed material from the gyratory crusher 12. The inside surface of the concave 24 is covered by a concave liner 36 to protect the concave 24 from damage and/or wear. The outside surface of the mantle 26 is covered by a mantle liner 38 to protect the mantle 26 against wear and/or damage. A spider assembly 40 is secured to the top of the concave 24 to cover the crushing chamber 20 and prevent the entry of errant debris. The spider assembly 40 comprises a bearing assembly 42 to rotatably receive an end of the spindle 28, and inlets (not shown) through which material is deposited into the crushing chamber 20 for crushing. In operation, material is deposited through the inlet of the spider assembly 40 and into the crushing chamber 20, where it becomes wedged between the concave 24 and the mantle 26.

As the mantle 26 travels around its circular orbit, material near the bottom portion 21 of the crushing chamber 20 will be crushed by the closing of the crushing chamber 20 between the moving mantle liner 36 and the stationary concave liner 34. Conversely, the opening of the bottom portion 21 of the chamber 20 between the moving mantle liner 36 and the stationary concave liner 34 will allow crushed material to exit the gyratory crusher 12 via the discharge outlet 34.

Figure 2A:
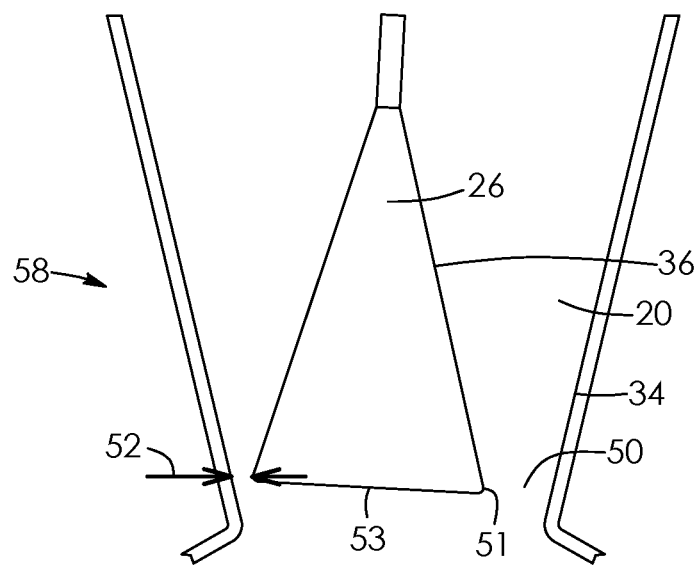
FIGS. 2A and B are schematic sectional views of the gap in the gyratory crusher as it moves between the open position and the closed position.
Figure 2B:
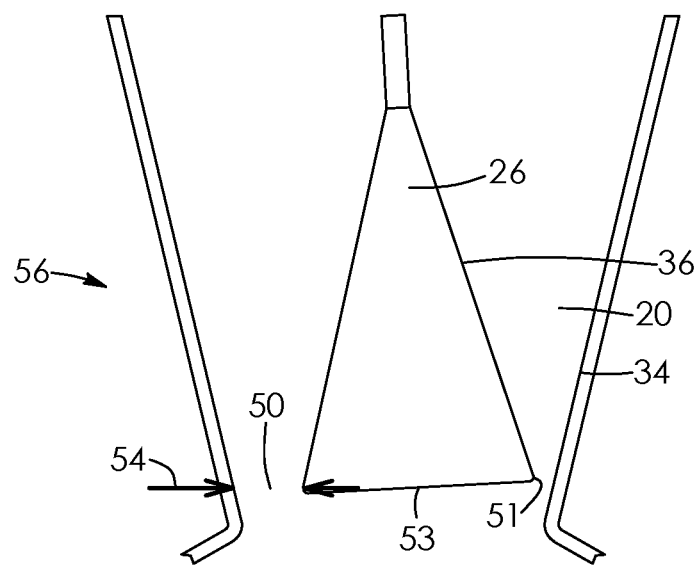

Referring to FIGS. 2A and 2B, the horizontal distance between the mantle liner 36 and the concave liner 34 at a gap 50 defines a closed-side setting (CSS) 52 and an open-side setting (OSS) 54. The gap 50 is adjacent the wear region 51 of the mantle liner 36, which is approximately 36 inches wide and starts about 6 inches from the bottom 53 of the mantle 26.

The location of the gap 50 to be measured is determined by the location that the mantle liner 36 is manually marked. This is most preferably at the narrowest part of the crushing chamber 20. As the rotation of the mantle 26 is eccentric the gap 50 moves between an open position, generally referred to as 56 (left side of FIG. 2B), which is where the OSS 54 is measured and a closed position, generally referred to as 58 (left side of FIG. 2A), which is where the CSS 52 is measured. Hence the CSS 52 is the shortest distance between the liners 34, 36 and the OSS 54 is the greatest distance between the liners 34, 36 throughout the throw of the mantle 26.

Figure 4:
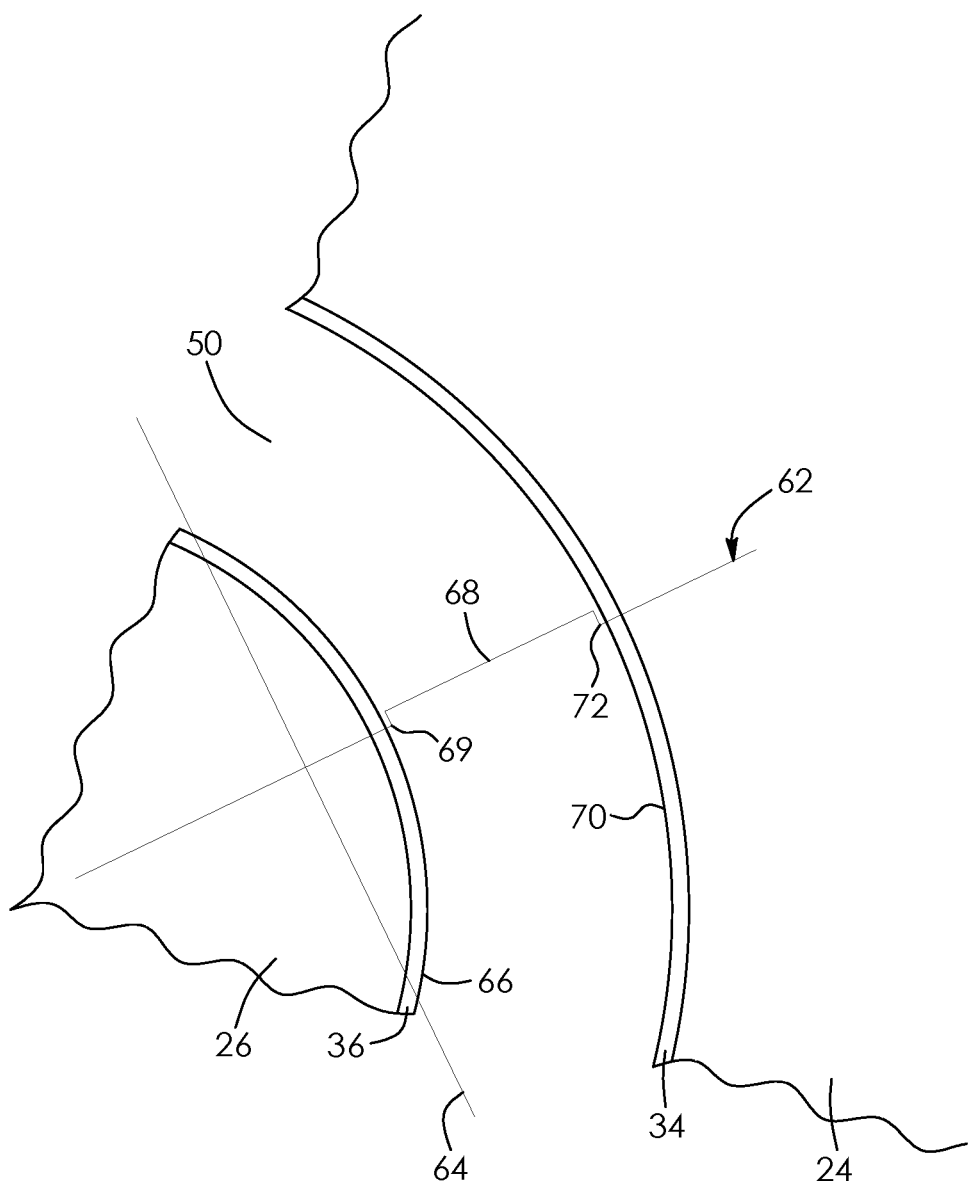
FIG. 4 is a schematic cross sectional view of the laser light trace across the mantle, gap and concave taken by the camera of the system.

As shown in FIGS. 3 and 3A, the detector assembly 16 is positioned above the gap 50 such that both the camera 18 and the laser emitter 22 are in line of sight 23 with the mantle liner 36 and concave liner 34 when the mantle 26 and the concave 24 are either at the stage of rotation where they are the closest to one another (the gap 50 is at its smallest), or are at their greatest distance apart or alternatively, at a preselected point in the rotation other than at the extremes. As shown in FIG. 4, the laser emitter 22 is positioned such that the cross hair, generally referred to as 62, marks the liners 34, 36 at the gap 50. A first trace 64 of the cross hair 62 is aligned with the outer edge 66 of the mantle liner 36 at the either the closed position 54 or at the open position 56 and a second trace 68 of the cross hair 62 traverses the gap 50 between the mantle liner 36 and the concave liner 34, extending over the concave liner 34. Where it crosses the outer edge 66 of the mantle liner 36, there is a first offset 69 in the second trace 68. Similarly, where it crosses the outer edge 70 of the concave liner 34, there is a second offset 72 in the second trace 68. This clearly indicates the location of the outer edge 66, 70 of the mantle liner 36 and the concave liner 34, respectively.

Figure 5:
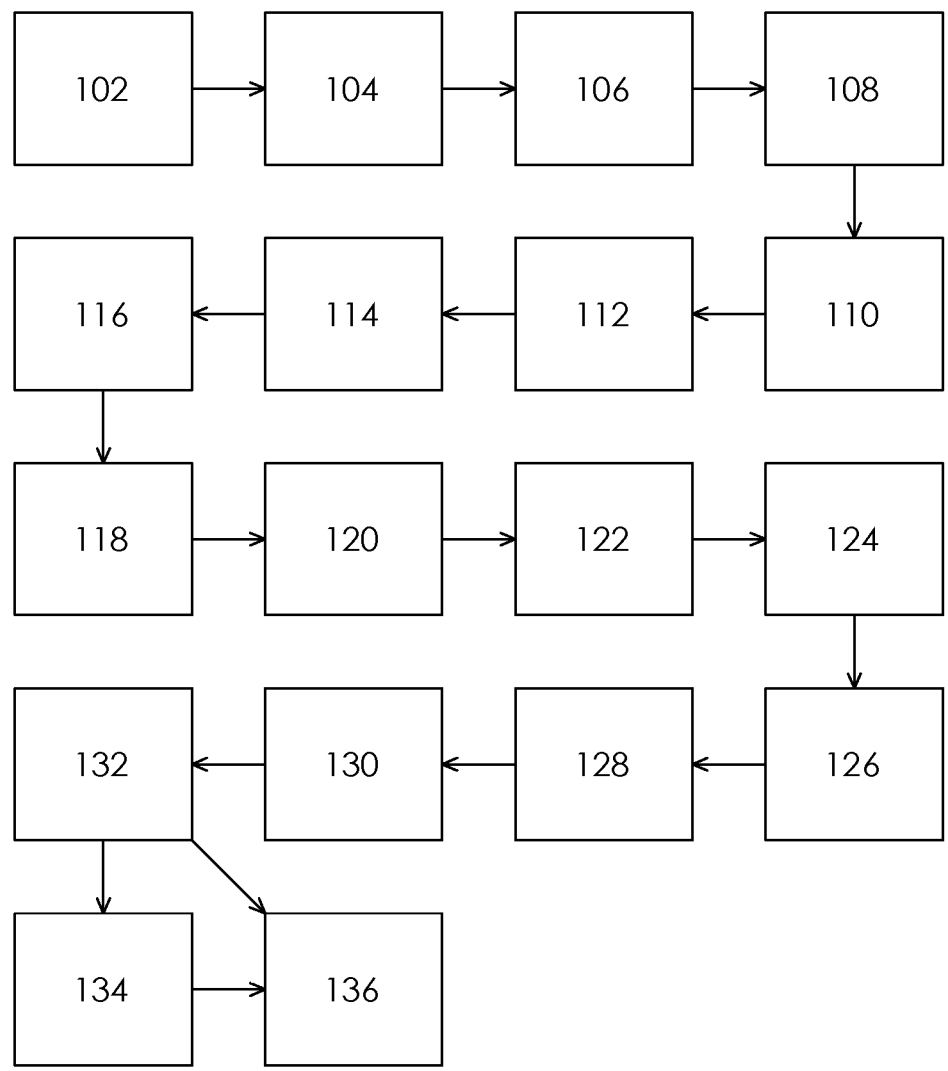
FIG. 5 is a flow chart of the method of calibrating the laser emitter.

As shown in FIG. 5, the laser emitter 22 must be calibrated and a computer program must be provided with calibration data. The laser emitter 22 calibration procedure occurs when at least one of the concave 24, the mantle 26 and liners 34, 36 are replaced 102 in the crusher 12. It only needs to be done at this time and done once. The laser emitter 22 is then activated 104 and positioned 106 such that the cross hair 62 marks 108 the liners 34, 36 at the gap 50, preferably, but not necessarily at the narrowest point of the gap 50. In the closed position 54 or in the open position 56, the first trace 64 of the cross hair 62 is aligned 110 with the outer edge 66 of the mantle liner 36 and the second trace 68 of the cross hair 62 traverses 112 the gap 50 between the mantle liner 36 and the concave liner 34, extending over the concave liner 34. The camera 18 is positioned 114 to have a line of sight to the cross hair 62.

The CSS 52 or the OSS 54 is then manually measured 116 (typically by a person entering into the crushing chamber 20) and the mantle and concave endpoints of the CSS 52 or OSS 54 are noted, e.g. by marking 118 the endpoints on the liners 34, 36 with a marker. The camera 18 then takes 120 an image ("calibration image") and the marked endpoints are located 122 in the image and their pixel position in the image is stored 124 in the computer program ("original mantle endpoint pixel position" and "original concave endpoint pixel position"). Then, the pixel distance between the end points in the image is then calculated 126 and a conversion ratio of pixel distance to the actual CSS or OSS (as manually measured) is determined 128. The computer 14 communicates 130 with the camera 18 to receive images taken by the camera 18 that include at the CSS 52 or at the OSS 54. The computer 14 comprises a processor and a memory having encoded thereon program code that when executed by the computer 14 processes 132 the images and determine the length of the CSS 52 or OSS 54. If OSS is measured, then CSS 52 can optionally be calculated 134 by subtracting the average throw 60 from the OSS 54. The data are stored 136.

Figure 6:
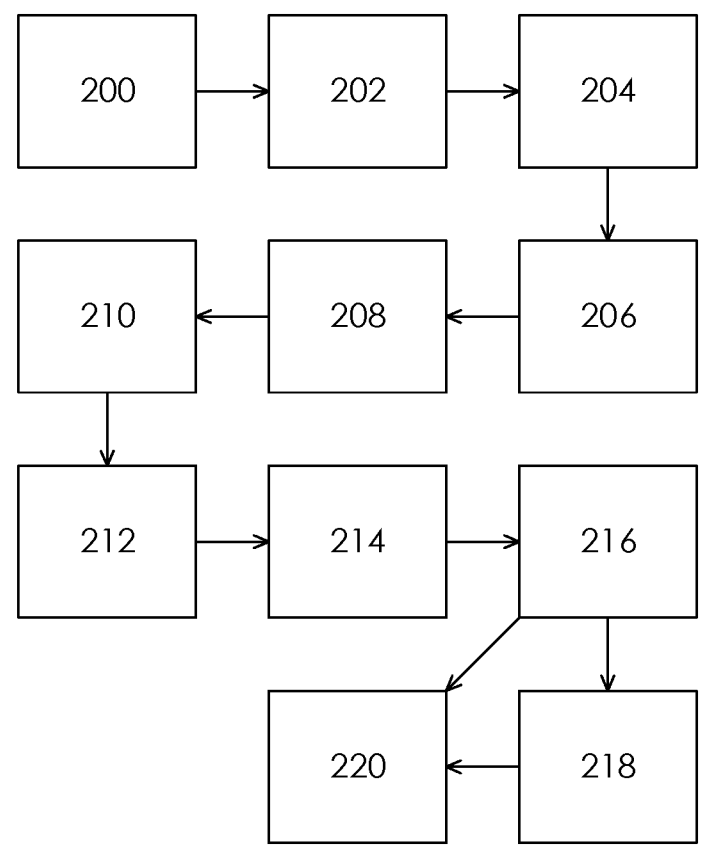
FIG. 6 is a flow chart of the method of determining the CSS.

As shown in FIG. 6, once the laser emitter 22 is calibrated and the calibration data obtained, then the CSS 52 or OSS 54 can be determined at any time that the crusher is clear of material, as follows. After the crusher chamber 20 has been cleared 200 of material, the laser emitter 22 is activated 202 and the camera 18 is operated 204 to take images. The camera captures at 4 frames per second, giving 20 frames per revolution of the mantle 26, as it takes 5 seconds to complete every revolution. The system 10 is programmed to capture 60 frames within approximately 15-20 seconds.

The captured images are then processed to locate the current mantle and concave endpoints of the CSS 52 or OSS 54 as follows. The concave endpoint is determined by using 206 an image processing routine to define the outer edge 70 of the concave liner 34 in the image, using the offset 72 in the second trace 68 assists in determining the outer edge 70 of the concave liner 34. Once this outer edge 70 has been located, the point on the outer edge having a pixel height corresponding in pixel height to the original concave endpoint pixel location is defined 208 as the current concave 24 endpoint in the image. Similarly, the point on captured image having a pixel height corresponding to the pixel height of the original mantle end point pixel location is defined 210 as the current mantle endpoint in the image.

Once the current mantle and concave endpoints have been located in the image, the pixel distance between the endpoints are calculated 212 to provide the width of the gap 50. Then, the conversion ratio is applied 214 to determine the actual distance of the current CSS 52 or OSS 54. If it is the OSS 54 being measured, the CSS 52 is optionally calculated 216 by subtracting the average throw 60 from the OSS 54. Within approximately 30-35 seconds all the data are recorded 218 and a minimum gap or a maximum gap is displayed 220. As noted above, the measurements can be done at any time that the crushing chamber is cleared of rock. The mantle may be moving or stationary.

Figure 7:
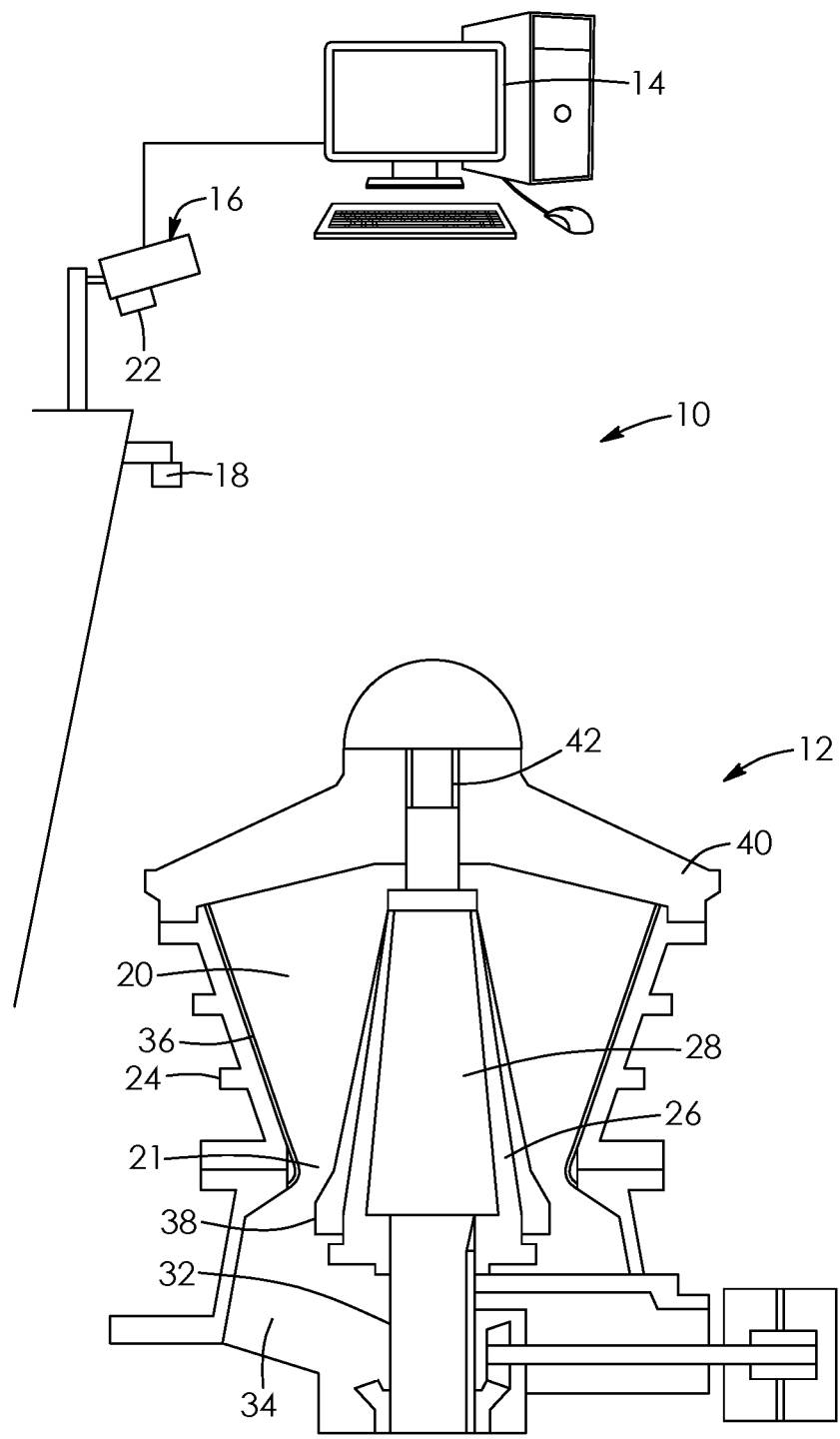
FIG. 7 is a side view of an alternative embodiment of the gyratory crusher, and a system for determining a closed side setting of the gyratory crusher.

Referring to FIG. 7 and according to another embodiment, the laser emitter 22 and camera 18 can be mounted on different positions from one another.

In yet another embodiment, machine vision technology is used to measure the gap width and then using the gap width, determine CSS or OSS.

Figure 8:
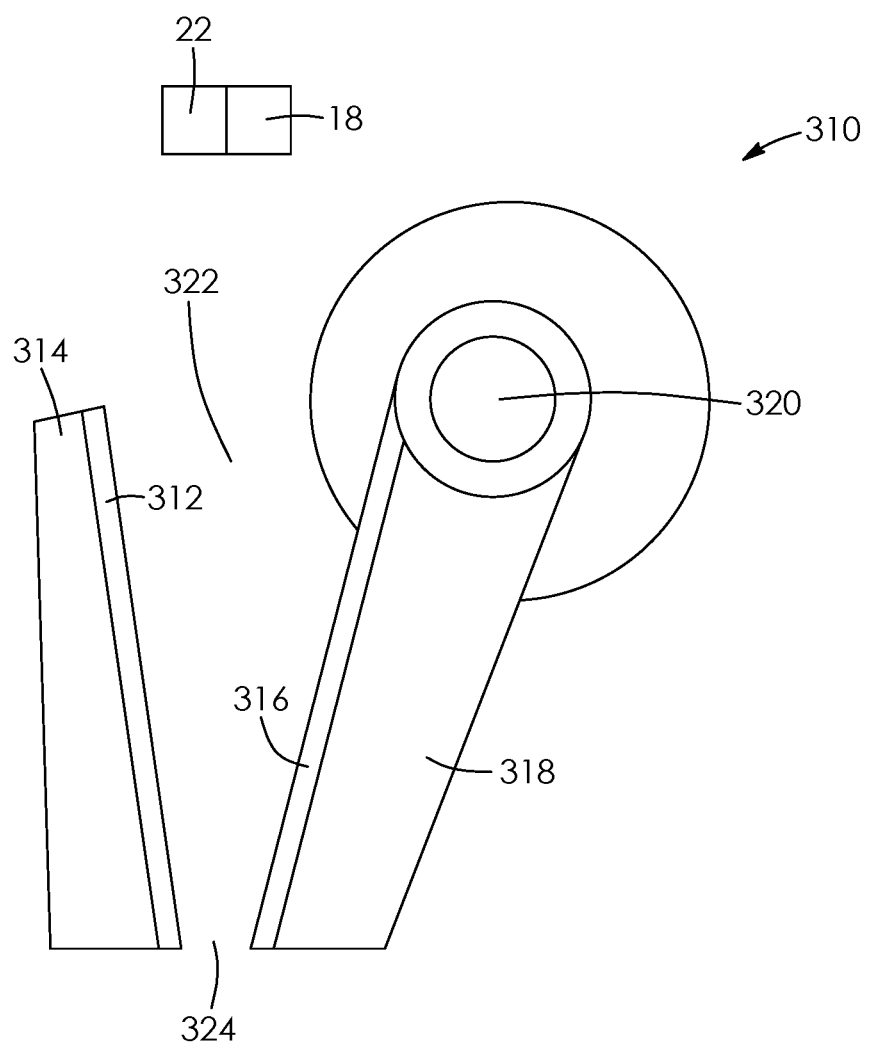

The system may be used for a jaw crusher, as shown in FIG. 8. The jaw crusher, generally referred to as 310 has a first jaw plate 312 on a first jaw 314 and a second jaw plate 316 on a pivoting jaw 318, and a pivot 320. The space between the plates is a crusher chamber 322. The narrowest region of the crusher chamber is the gap 324. The laser emitter 22 and camera 18 are located such that the laser emitter produces a trace that bisects the pivoting jaw in a predetermined position of the pivoting jaw (again, this could be at OSS or at CSS) and the camera captures an image of the trace and an outer edge of the first jaw plate at the predetermined position of the pivoting jaw at the gap. As for the gyratory crusher, the camera communicates with the computer and the images are processed to provide a gap width and to calculate at least one of a close-side setting and an open-side setting from the gap width. This can be done as the crusher is active, as long as the crusher chamber is free of material.

Example 1

The laser emitter 22 is calibrated. This occurs once at the time that the mantle is replaced or liners are replaced. The memory stores the calibration data, which may include images or processed data. The operator can then check the gap width in under five minutes. It is suggested that this check is done daily. General Instructions are as follows:

Results are achieved when the program is operated in the absence of dust/snow/rain. Measurement is taken right after first daytime lunch break and before the crusher goes back into operation. The mantle continues to rotate.

Operation Steps:
1. Turn ON the laser/camera switch from the electrical control panel.
2. Open the gap measurement software from the computer desktop.
3. Click Connect to Camera. Once the camera is connected, the program will show red adjustment lines to align the concave edge and the laser.
4. If the red arc and straight line in the program is aligned with the concave edge and the laser line respectively, click on Start Test in the program. Wait 30 seconds, the program will show the close-side setting (CSS) gap.
5. Optionally, perform two successive bucket checks after each measurement is acquired with the system and record the bucket data in log book (this step is not needed when using the technology of the present invention, however, a user may wish to conduct this test when first starting to use the present technology in order to relate their past readings with the output of the new technology.

Troubleshooting:
a) If the red arc and straight line in the program is not aligned with the concave edge and the laser line respectively, use the Joystick next to the computer to perform the adjustment. Try to make the best alignment. Then follow step 5.
b) If a zero reading is presented, it indicates the presence of dust/snow/rain in the lens view. Wait for media to clear first. Then follow step 5.

Example 2

The laser emitter 22 is calibrated. This occurs once at the time that the mantle is replaced or liners are replaced. The operator can check the gap width in under five minutes. It is suggested that this check is done daily. General Instructions are as follows:

Results are achieved when the program is operated in the absence of dust/snow/rain. Measurement is taken right after first daytime lunch break and before the crusher goes back into operation. The mantle continues to rotate.

Operation Steps:
1. Turn ON the laser/camera switch from the electrical control panel.
2. Open the gap measurement software from the computer desktop.
3. Click Connect to Camera. Once the camera is connected, the program will show red adjustment lines to align the concave edge and the laser.
4. If the red arc and straight line in the program is aligned with the concave outer edge and the laser line respectively, click on Start Test in the program. Wait 30 seconds, the program will show the open-side setting (OSS) gap.

Troubleshooting:

a) If the red arc and straight line in the program is not aligned with the concave outer edge and the laser line respectively, use the Joystick next to the computer to perform the adjustment. Try to make the best alignment. Then follow step 5.

b) If a zero reading is presented, it indicates the presence of dust/snow/rain in the lens view. Wait for media to clear first. Then follow step 5.

All methods described herein can be performed in any suitable order unless otherwise indicated herein or otherwise clearly contradicted by context. The use of any and all examples, or exemplary language (e.g., "such as") provided herein, is intended merely to better illuminate the example embodiments and does not pose a limitation on the scope of the claimed invention unless otherwise claimed. No language in the specification should be construed as indicating any non-claimed element as essential.

Advantages of the exemplary embodiments described herein may be realized and attained by means of the instrumentalities and combinations particularly pointed out in this written description. It is to be understood that the foregoing general description and detailed description are exemplary and explanatory only and are not restrictive of the claims below. While example embodiments have been described in detail, the foregoing description is in all aspects illustrative and not restrictive. It is understood that numerous other modifications and variations can be devised without departing from the scope of the example embodiment. For example, as described, the gap width at any predetermined point in the throw of the mantle can be used to determine the OSS or CSS.

The invention claimed is:

1. A system for determining a close-side setting or an open-side setting for a gyratory crusher, wherein the gyratory crusher comprises an eccentrically rotatable mantle lined with a mantle liner, a concave lined with a concave liner, the concave housing the mantle to provide a crusher chamber, the crusher chamber having a gap, the system comprising a laser emitter mounted to mark a first trace bisecting the mantle at a predetermined rotational position of the mantle at the gap, a camera mounted to capture an at least one image of the first trace and an outer edge of the concave liner at the predetermined rotational position of the mantle at the gap, and a computer in communication with the camera, the computer comprising a memory and a processor, the memory providing instructions to the processor to process the image to provide a gap width and to calculate at least one of the close-side setting and the open-side setting from the gap width.

2. The system of claim 1, wherein the laser emitter is a cross hair laser emitter or a three dimensional laser emitter emitting the first trace and a second trace, the laser emitter mounted to mark the first trace bisecting the mantle and to mark the second trace traversing the gap and at least intersecting the concave liner at the predetermined rotational position of the mantle to provide an offset at the outer edge of the concave liner.

3. The system of claim 1, wherein the camera is configured to capture a series of images as the mantle rotates.

4. The system of claim 1, wherein the laser emitter and camera are permanently mounted proximate the crusher.

5. The system of claim 1, wherein the memory stores calibration data.

6. The system of claim 5, wherein the memory provides instructions for the processor to determine wear based on the gap width.

7. A method of determining a close-side setting or an open-side setting for a gyratory crusher by measuring a gap width, wherein the gyratory crusher comprises an eccentrically rotatable mantle lined with a mantle liner, a concave lined with a concave liner, the concave housing the mantle to provide a crusher chamber, the crusher chamber having a gap, the method comprising the steps of: (i) aligning a laser emitter to mark a first laser bisecting the mantle at a selected rotational position of the mantle at the gap; and (ii) using a machine vision system that has been calibrated: aligning an imager to capture an image of the first trace and an outer edge of the concave liner at the gap at the selected rotational position of the mantle and capturing the image; processing the image; measuring a distance between the first trace and the outer edge of the concave liner to provide a gap width; and calculating the closed-side setting or the open-side setting, thereby determining at least one of the close-side setting and the open-side setting.

8. The method of claim 7, wherein the imager is a camera.

9. The method of claim 7 wherein the laser emitter is a cross hair laser emitter.

10. The method of claim 7 wherein the laser emitter is a three dimensional laser emitter.

11. The method of claim 7 further comprising the step of aligning the laser emitter such that a second trace traverses the gap and at least intersects the concave liner at the selected position of the gap to provide a first offset in the second trace for identifying an outer edge of the mantle liner and a second offset for identifying an outer edge of the concave liner.

12. The method of claim 7 wherein the mantle is rotating as the camera is capturing images.

13. The method of claim 7, wherein the method is completed in about five minutes.

14. The method of claim 7, wherein the selected rotational position provides the gap at a closed-side setting.

15. The method of claim 7, wherein the selected rotational position provides the gap at an open-side setting, the method including calculating the close-side setting from the gap width at the open-side setting.

16. A gyratory crusher combination, the gyratory crusher combination comprising a gyratory crusher, the gyratory crusher including an eccentrically rotating mantle lined with a mantle liner, a concave lined with a concave liner, the concave housing the mantle to provide a crusher chamber, and the crusher chamber having a gap, the improvement comprising a system for determining a close-side setting or an open-side setting for the gyratory crusher including a laser emitter for emitting a first trace, the laser emitter mounted to mark the first trace on the mantle at a predetermined position of the gap, a camera mounted to capture a series of image of the first trace as the mantle of the gyratory crusher rotates, and a computer in communication with the camera, the computer comprising a memory and a processor, the memory providing instructions to the processor to process the image to provide a gap width and to determine at least one of a close-side setting or an open-side setting from the gap width.

17. The gyratory crusher combination of claim 16, wherein, the laser emitter is a cross hair laser emitter for emitting the first trace and a second trace, the laser emitter mounted to mark the first trace bisecting the mantle and to mark the second trace traversing the gap and at least intersecting the concave liner at the predetermined position of the gap.

18. The gyratory crusher combination of claim 17, wherein the second trace has an offset at an outer edge of the concave liner.

19. The gyratory crusher combination of claim 18, wherein the second trace has a second offset at an outer edge of the mantle liner.

20. The gyratory crusher combination of claim 19, wherein the predetermined position of the gap is at the close-side setting.

21. The gyratory crusher combination of claim 19, wherein the predetermined position of the gap is at the open-side setting.

22. A system for determining a close-side setting or an open-side setting for a jaw crusher, wherein the jaw crusher comprises a first jaw plate on a first side and a second jaw plate on a pivoting jaw to provide a crusher chamber, the crusher chamber having a gap, the system comprising a laser emitter mounted to mark a first trace bisecting the pivoting jaw at a predetermined position of the pivoting jaw at the gap, a camera mounted to capture an at least one image of the first trace and an outer edge of the first jaw plate at the predetermined position of the pivoting jaw at the gap, and a computer in communication with the camera, the computer comprising a memory and a processor, the memory providing instructions to the processor to process the image to provide a gap width and to calculate at least one of a close-side setting and an open-side setting from the gap width.

* * * * *